(12) United States Patent
Ishikawa et al.

(10) Patent No.: US 8,985,450 B2
(45) Date of Patent: Mar. 24, 2015

(54) CARD INSERTION PART AND CARD READER

(75) Inventors: Kazutoshi Ishikawa, Nagano (JP); Yukihiko Takita, Nagano (JP); Shinya Miyazawa, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 14/119,059

(22) PCT Filed: May 21, 2012

(86) PCT No.: PCT/JP2012/062904
§ 371 (c)(1),
(2), (4) Date: Feb. 21, 2014

(87) PCT Pub. No.: WO2013/001937
PCT Pub. Date: Jan. 3, 2013

(65) Prior Publication Data
US 2014/0332591 A1    Nov. 13, 2014

(30) Foreign Application Priority Data

Jun. 29, 2011 (JP) .................................. 2011-144074

(51) Int. Cl.
| | |
|---|---|
| G06K 7/08 | (2006.01) |
| G11B 5/008 | (2006.01) |
| G06K 13/067 | (2006.01) |
| G07F 19/00 | (2006.01) |
| G07F 7/08 | (2006.01) |

(52) U.S. Cl.
CPC ............ *G06K 7/083* (2013.01); *G11B 5/00808* (2013.01); *G06K 13/067* (2013.01); *G07F 19/2055* (2013.01); *G07F 7/0893* (2013.01)

USPC .......................................... 235/449; 235/492

(58) Field of Classification Search
CPC . G06K 13/067; G06K 7/084; G11B 5/00808; G06Q 20/02
USPC .................... 235/383, 449, 487, 492
See application file for complete search history.

(56) References Cited

U.S. PATENT DOCUMENTS

| | | | |
|---|---|---|---|
| 2004/0026507 A1* | 2/2004 | Nagata et al. | 235/449 |
| 2007/0080225 A1* | 4/2007 | Hirasawa et al. | 235/449 |

FOREIGN PATENT DOCUMENTS

| | | | |
|---|---|---|---|
| JP | 3806271 B2 | 5/2006 | |
| JP | 3936496 B2 | 3/2007 | |

(Continued)

OTHER PUBLICATIONS

International Search Report for International Application No. PCT/JP2012/062904; Date of Mailing: Jul. 10, 2012, with English Translation.

*Primary Examiner* — Sonji Johnson
(74) *Attorney, Agent, or Firm* — Cantor Colburn LLP

(57) ABSTRACT

Provided is a card insertion unit for a card reader which, without weakening a magnetic field generated by a magnetic field generating device in order to prevent reading of magnetic data by a magnetic head for skimming, is capable of reducing the effect of the magnetic field upon the reading of the magnetic data by way of the magnetic head for data reading. This card insertion unit may be provided with a notch formed at a point at which a magnetic stripe passes at insertion time of the card a projecting portion which projects toward the upstream side of the insertion direction of the card and a magnetic field generating device disposed in the interior of the projecting portion.

8 Claims, 5 Drawing Sheets

(56) References Cited

FOREIGN PATENT DOCUMENTS

| | | | |
|---|---|---|---|
| JP | 2007164533 A | 6/2007 | |
| WO | 2011093340 A1 | 8/2011 | |
| WO | 2011096507 A1 | 8/2011 | |
| WO | 2012073691 A1 | 6/2012 | |

* cited by examiner

Fig. 5(A)
Fig. 5(B)
Fig. 5(C)
Fig. 5(D)
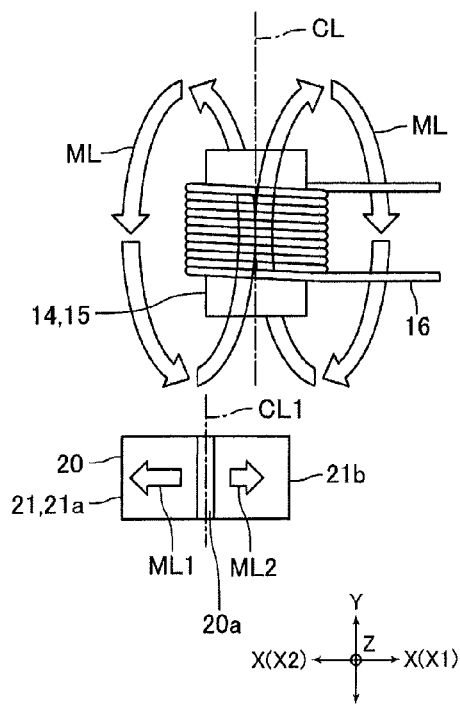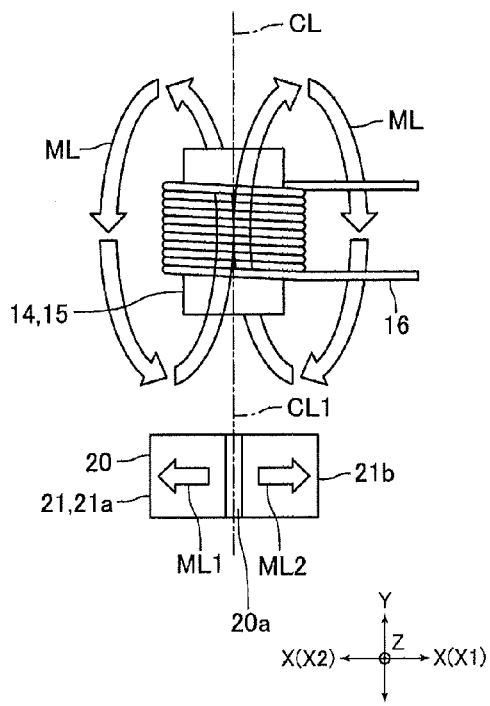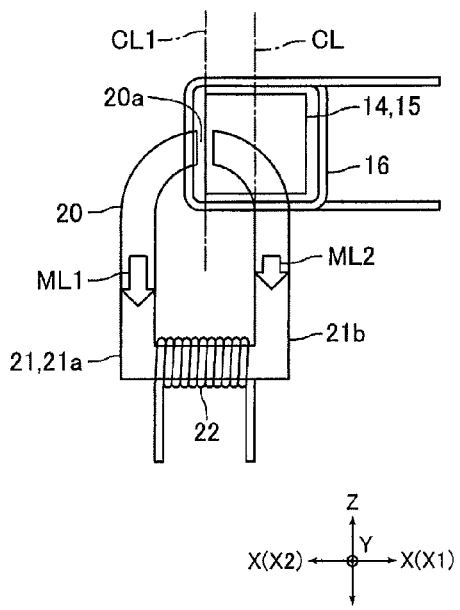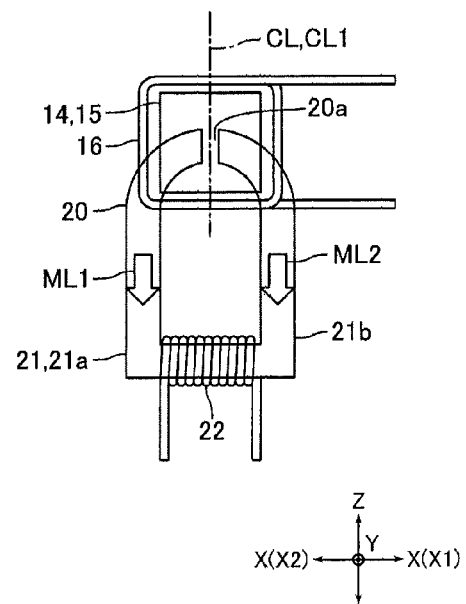

CARD INSERTION PART AND CARD READER

CROSS REFERENCE TO RELATED APPLICATIONS

This is a U.S. national stage of International Application No. PCT/JP2012/062904, filed on May 21, 2012. Priority under 35 U.S.C. §119(a) and 35 U.S.C. §365(b) is claimed from Japanese Application No. 2011-144074, filed Jun. 29, 2011, the disclosure of which is also incorporated herein by reference.

TECHNICAL FIELD

The present invention relates to a card insertion part for a card reader into which a card having a magnetic stripe is inserted, and a card reader provided with the card insertion part.

BACKGROUND

Conventionally, a card reader structured to read magnetic data on a card and/or record magnetic data on a card has been widely utilized. In an industry of the financial institutions where the card reader is utilized, a so-called skimming has conventionally become a serious problem in which a criminal attaches a magnetic head to a card insertion part of the card reader to illegally acquire magnetic data of a card by using the magnetic head. In order to prevent this problem, a card reader has been proposed which is provided with a disturbing magnetic field generator for preventing reading of magnetic data by using a magnetic head for skimming (hereinafter, referred to as a "skimming magnetic head" (see, for example, Patent Literature 1).

In the card reader described in Patent Literature 1, at the time of card insertion when a card is to be inserted into the card reader, a disturbing magnetic field generator is driven for a predetermined time period to generate a disturbance magnetic field. Therefore, even when a skimming magnetic head is attached to a card insertion part, it is possible that illegal acquisition of magnetic data is prevented by preventing appropriate reading of magnetic data through the skimming magnetic head.

The card reader described in Patent Literature 1 is provided with a disturbance magnetic field generator and thus, as described above, reading of magnetic data by a skimming magnetic head can be prevented. However, in the card reader, the magnetic field generated by the disturbing magnetic field generator may affect reading of magnetic data by a magnetic head for data reading which is arranged in an inside of the card reader. In order to reduce the problem, it is conceivable that the disturbing magnetic field generated by the disturbing magnetic field generator is reduced, or that generation of the disturbing magnetic field is stopped at the time of reading of magnetic data by the magnetic head for data reading. However, according to these measures, it may be difficult to prevent reading of magnetic data by a skimming magnetic head.

SUMMARY

In view of the problem described above, at least an embodiment of the present invention provides a card insertion part for a card reader which is capable of reducing influence of a magnetic field generated by a magnetic field generation device on reading of magnetic data by a magnetic head for reading of magnetic data disposed in an inside of the card reader without reducing the magnetic field generated by the magnetic field generation device for preventing reading of magnetic data by a skimming magnetic head or without stopping generation of the magnetic field at the time of reading of magnetic data by the magnetic head for reading of magnetic data for preventing reading of magnetic data by a skimming magnetic head. Further, at least an embodiment of the present invention provides a card reader provided with the card insertion part.

To achieve the above, at least an embodiment of the present invention provides a card insertion part for a card reader into which a card having a magnetic stripe is to be inserted, including a cut-off part which is formed at least at a portion where the magnetic stripe passes when the card is inserted, a protruded part which is adjacent to the cut-off part in a widthwise direction of the card which is substantially perpendicular to an inserting direction of the card and is protruded toward an upstream side in the inserting direction of the card, and a magnetic field generation device which is disposed in an inside of the protruded part and is structured to generate a magnetic field. The magnetic field generation device includes a core formed of magnetic material and a coil wound around the core, and the magnetic field generation device is disposed so that magnetic lines of force indicating the magnetic field generated by the magnetic field generation device are passed through a position where the magnetic stripe is passed when the card is inserted and so that a direction of the magnetic lines of force coming out from an end face of the core and/or a direction of the magnetic lines of force entering into an end face of the core are inclined with respect to the inserting direction of the card.

In the card insertion part in accordance with at least an embodiment of the present invention, the magnetic field generation device is disposed so that, when a card is inserted, the magnetic lines of force generated by the magnetic field generation device pass the position where its magnetic stripe is passed. A skimming magnetic head is attached to a position where the magnetic stripe is passed and thus, according to at least an embodiment of the present invention, for example, reading of magnetic data by the skimming magnetic head is prevented by utilizing a magnetic field generated by the magnetic field generation device, or it can be detected that a skimming magnetic head has been attached to a front face side of the card insertion part.

Further, in at least an embodiment of the present invention, the magnetic field generation device is disposed so that a direction of the magnetic lines of force coming out from an end face of the core and/or a direction of the magnetic lines of force entering into an end face of the core are inclined with respect to the inserting direction of the card. Therefore, the magnetic field generated by the magnetic field generation device does not easily affect on a magnetic head for reading data which is disposed in an inside of the card reader on a downstream side in the inserting direction of a card. Accordingly, influence of a magnetic field generated by the magnetic field generation device on reading of magnetic data by a magnetic head for reading of magnetic data is reduced without reducing the magnetic field generated by the magnetic field generation device or without stopping generation of the magnetic field at the time of reading of magnetic data by the magnetic head for reading data.

Further, in at least an embodiment of the present invention, the cut-off part is formed at a portion where the magnetic stripe is passed when a card is inserted and thus, a criminal easily attaches a skimming magnetic head to the cut-off part. In other words, an attaching position of a skimming magnetic head is easily specified. Therefore, according to at least an embodiment of the present invention, a magnetic field for preventing reading of magnetic data by a skimming magnetic head is easily generated toward the skimming magnetic head, and it is easily detected that a skimming magnetic head is attached to the front face side of the card insertion part.

Further, in at least an embodiment of the present invention, the magnetic field generation device is disposed in the inside of the protruded part which is required to form a cut-off part in which a part of a card is exposed so that a user is capable of holding the part of the card exposed in the cut-off part for taking out the card from the card insertion part. Therefore, the magnetic field generation device can be disposed in an inside of the protruded part which is usually formed as a dead space. Accordingly, in at least an embodiment of the present invention, a space for disposing the magnetic field generation device is not required to separately provide in the card insertion part and thus the size of the card insertion part can be reduced.

In at least an embodiment of the present invention, the phrase of that "a direction of the magnetic lines of force coming out from an end face of the core and/or a direction of the magnetic lines of force entering into an end face of the core are inclined with respect to the inserting direction of the card" means that a direction of the magnetic lines of force coming out from an end face of the core and/or a direction of the magnetic lines of force entering into an end face of the core are not parallel to the inserting direction of the card, and that a direction of the magnetic lines of force coming out from an end face of the core and/or a direction of the magnetic lines of force entering into an end face of the core are inclined so as to cross the inserting direction of the card. This case may include that a direction of the magnetic lines of force coming out from an end face of the core and/or a direction of the magnetic lines of force entering into an end face of the core are substantially parallel to the widthwise direction of the card.

In at least an embodiment of the present invention, it is preferable that the magnetic field generation device is disposed so that, when viewed in a thickness direction of the card which is substantially perpendicular to the inserting direction of the card and the widthwise direction of the card, the direction of the magnetic lines of force coming out from an end face of the core and/or the direction of the magnetic lines of force entering into an end face of the core are substantially parallel to the widthwise direction of the card. In other words, in at least an embodiment of the present invention, for example, it is preferable that the core is disposed with the widthwise direction of the card as a direction of a center axis of the core when viewed in a thickness direction of the card which is substantially perpendicular to the inserting direction of the card and the widthwise direction of the card, and the coil is wound around with the center axis of the core as a center. According to this structure, even when a distance between a magnetic head for reading data and the magnetic field generation device is small in the inserting direction of the card, influence of the magnetic field generated by the magnetic field generation device is hard to be applied to the magnetic head for reading data. Therefore, while influence of the magnetic field generated by the magnetic field generation device on reading of magnetic data by the magnetic head for reading data is reduced, a distance between the magnetic head for reading data and the magnetic field generation device can be shortened in the inserting direction of a card and, as a result, the size of the card reader to which the card insertion port is attached can be reduced.

In at least an embodiment of the present invention, for example, the magnetic field generation device is structured to generate a disturbing magnetic field for disturbing reading of magnetic data recorded in the magnetic stripe by a skimming magnetic head which is attached to a front face side of the card insertion part. In this case, reading of magnetic data by a skimming magnetic head is prevented by a disturbing magnetic field which is generated by the magnetic field generation device.

In at least an embodiment of the present invention, it is preferable that a part of the magnetic field generation device is disposed on a downstream side in the inserting direction of the card with respect to a downstream side end face of the cut-off part in the inserting direction of the card. Further, in at least an embodiment of the present invention, it is preferable that the center axis of the core is disposed in the inserting direction of the card at the same position as a downstream side end face of the cut-off part in the inserting direction of the card, or the center axis of the core is disposed on a downstream side with respect to the downstream side end face of the cut-off part. In a case that the position of the center axis of the core is coincided with the center position of a skimming magnetic head in the inserting direction of a card, even when a disturbing magnetic field is generated by the magnetic field generation device, the disturbing magnetic field does not act on the skimming magnetic head as a disturbing magnetic field. In other words, in a case that the position of the center axis of the core and the center position of a skimming magnetic head are coincided with each other in the inserting direction of a card, even when a disturbing magnetic field is generated by the magnetic field generation device, noise for disturbing reading of data is not added to magnetic data read by the skimming magnetic head.

In a case that a part of the magnetic field generation device is disposed on a downstream side with respect to the downstream side end face of the cut-off part in the inserting direction of a card, the center position of a skimming magnetic head and the position of the center axis of the core are easily prevented from being coincided with each other in the inserting direction of a card. Therefore, in this case, reading of magnetic data by a skimming magnetic head is prevented by a disturbing magnetic field generated by the magnetic field generation device with a higher degree of probability. Further, when the center axis of the core is disposed in the inserting direction of a card at the same position as the downstream side end face of the cut-off part in the inserting direction of the card, or on a downstream side with respect to the downstream side end face of the cut-off part, the center position of the skimming magnetic head and the position of the center axis of the core are prevented from being coincided with each other in the inserting direction of a card. Therefore, in this case, reading of magnetic data by a skimming magnetic head is surely prevented by a disturbing magnetic field generated by the magnetic field generation device.

In at least an embodiment of the present invention, it is preferable that the magnetic field generation device includes a cable structured to supply an electric current to the coil, and the cable is disposed and routed in a vicinity of the downstream side end face of the cut-off part. According to this structure, for example, when a criminal cuts and removes a downstream side end face of the cut-off part toward a downstream side for setting the position of the center axis of the core and the center position of a skimming magnetic head to coincide with each other in the inserting direction of a card, the cable may be disconnected. Therefore, for example, when disconnection of the cable is detected, it may be detected that a criminal has performed a trick for setting the position of the center axis of the core and the position of the center position of the skimming magnetic head to coincide with each other in the inserting direction of a card.

The card insertion part in accordance with at least an embodiment of the present invention may be used in a card reader having a magnetic head structured to read magnetic data recorded in a magnetic stripe. In the card reader, influence of a magnetic field generated by the magnetic field generation device on reading of magnetic data by a magnetic head for reading magnetic data is reduced without reducing a magnetic field generated by the magnetic field generation device, or without stopping generation of the magnetic field when magnetic data are to be read by the magnetic head for reading data.

As described above, according to the card insertion part and the card reader in accordance with at least an embodiment of the present invention, influence of a magnetic field generated by the magnetic field generation device on reading of magnetic data by a magnetic head for reading of magnetic data is reduced without reducing a magnetic field generated by the magnetic field generation device or without stopping generation of the magnetic field at the time of reading of magnetic data by the magnetic head for reading data.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIGS. 5(A) through 5(D) are views for explaining advantageous effects of the card reader shown in FIG. 1.

DESCRIPTION OF EMBODIMENTS

Embodiments of the present invention will be described below with reference to the accompanying drawings.
(Schematic Structure of Card Reader)

Figure 1:
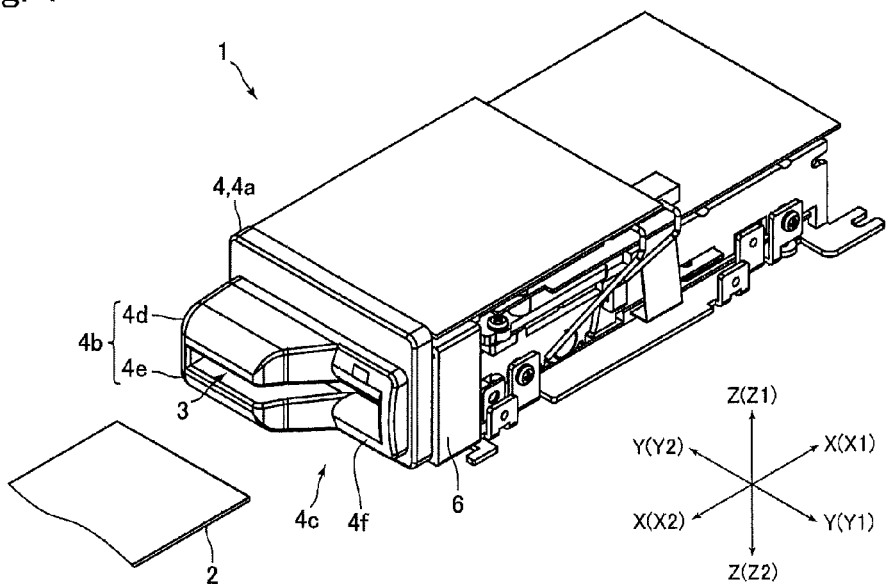
FIG. 1 is a perspective view showing a card reader in accordance with an embodiment of the present invention.
Figure 2:
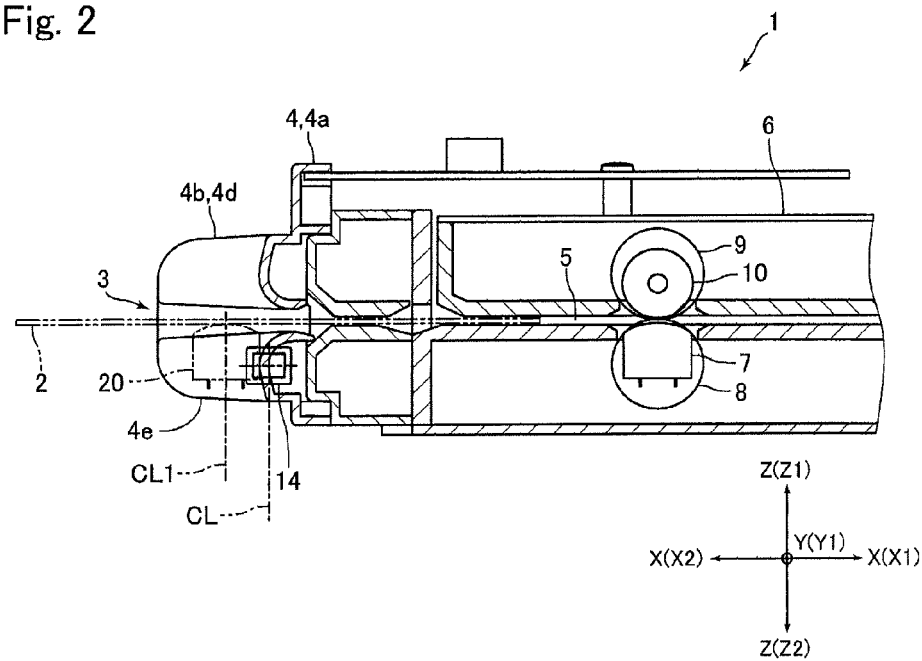
FIG. 2 is a schematic cross-sectional view showing a front face side of the card reader in FIG. 1.

FIG. 1 is a perspective view showing a card reader 1 in accordance with an embodiment of the present invention. FIG. 2 is a schematic cross-sectional view showing a front face side of the card reader 1 in FIG. 1.

A card reader 1 in this embodiment is a device which is structured to perform reading of magnetic data recorded on a card 2 and/or recording of magnetic data on a card 2, and is, for example, mounted and used in a predetermined host apparatus such as an ATM. The card reader 1 is, as shown in FIGS. 1 and 2, provided with a card insertion part 4 formed with an insertion port 3 into which a card 2 is inserted, and a main body part 6 in which a card feeding passage 5 for feeding the card 2 is formed. An inside of the main body part 6 is disposed with a magnetic head 7 for performing reading of magnetic data and/or recording of magnetic data, and a drive roller 8 and a pad roller 9 for feeding the card 2.

In this embodiment, a card 2 is fed in an "X" direction shown in FIG. 1 and the like. Specifically, a card 2 is inserted in an "X1" direction and the card 2 is ejected in an "X2" direction. In other words, the "X1" direction is an inserting direction of a card 2 and the "X2" direction is an ejecting direction of a card 2. Further, the "X1" direction side is a downstream side in the inserting direction of a card 2 and the "X2" direction side is an upstream side in the inserting direction of a card 2. In addition, a "Z" direction in FIG. 1 and the like which is substantially perpendicular to the "X" direction is a thickness direction of a card 2, and a "Y" direction in FIG. 1 and the like which is substantially perpendicular to the "X" direction and the "Z" direction is a widthwise direction (short widthwise direction) of a card 2. In the following descriptions, the "X1" direction side is referred to as a "back" (rear) side, the "X2" direction side is referred to as a "front" side, a "Y1" direction side is a "right" side, a "Y2" direction side is a "left" side, a "Z1" direction side is an "upper" side, and a "Z2" direction side is a "lower" side.

A card 2 is, for example, a rectangular card made of vinyl chloride whose thickness is about 0.7-0.8 mm. A magnetic stripe 2a (see FIG. 3) in which magnetic data are recorded is formed on a rear face (under face) of the card 2. In accordance with an embodiment of the present invention, an IC chip may be fixed on a surface of a card 2 and an antenna for communication may be incorporated in a card 2. Further, the card 2 may be a PET (polyethylene terephthalate) card whose thickness is about 0.18-0.36 mm or may be a paper card having a predetermined thickness.

The card insertion part 4 is attached to a front end face of the main body part 6. A detailed structure of the card insertion part 4 will be described below.

A magnetic head 7 is disposed so that its gap part faces the card feeding passage 5 from a lower side. Further, the magnetic head 7 is disposed at a position so as to be capable of contacting with a magnetic stripe 2a of a card 2. An opposite roller 10 is disposed on an upper side of the magnetic head 7 and faces the magnetic head 7 in an upper and lower direction. The drive roller 8 is disposed so as to face the card feeding passage 5 from a lower side. A pad roller 9 faces the drive roller 8 on an upper side with respect to the drive roller 8 and is urged toward the drive roller 8.

(Structure of Card Insertion Part)

Figure 3:
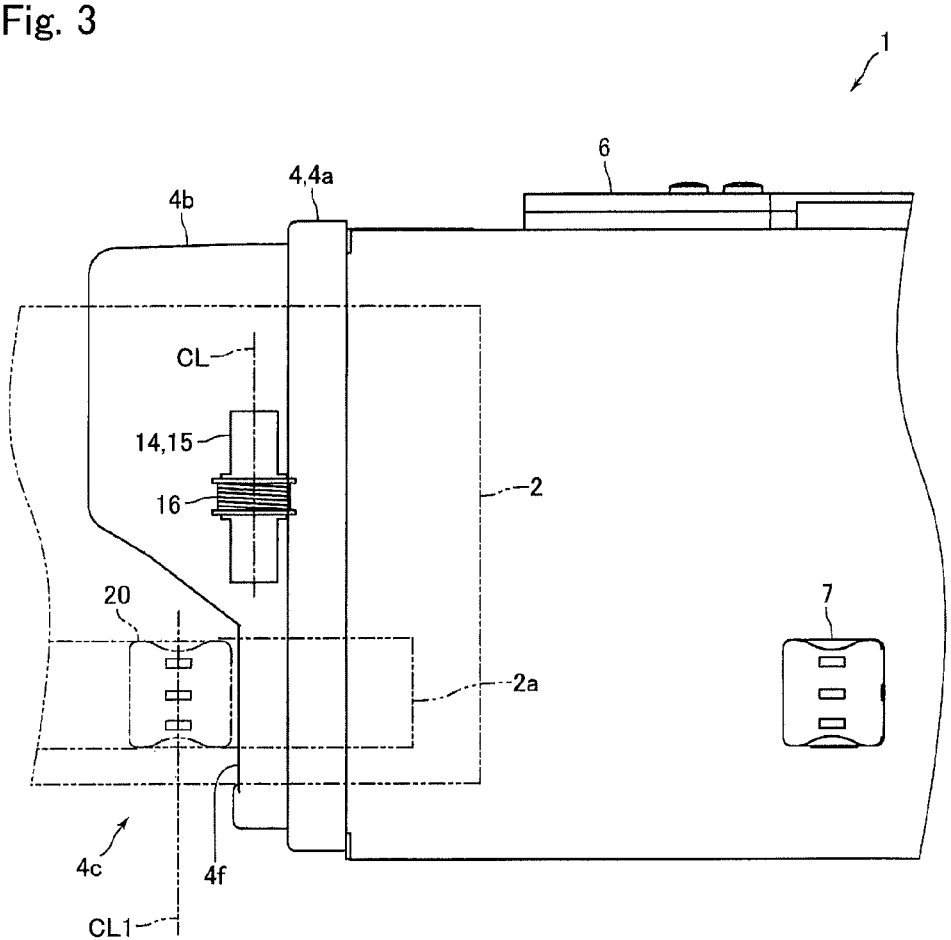
FIG. 3 is an explanatory schematic plan view showing a structure of the front face side of the card reader shown in FIG. 1.
Figure 3:
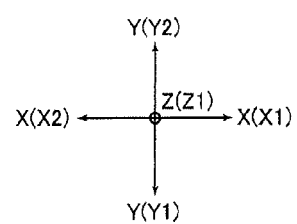
Figure 4:
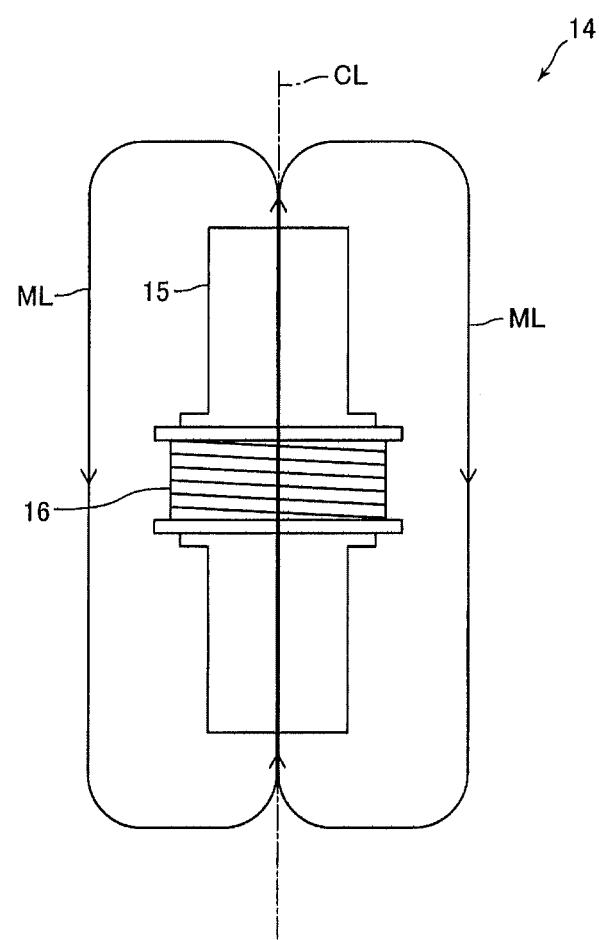
FIG. 4 is an explanatory view showing a structure of a magnetic field generation device shown in FIG. 3.

FIG. 3 is an explanatory schematic plan view showing a structure of the front face side of the card reader 1 shown in FIG. 1. FIG. 4 is an explanatory view showing a structure of a magnetic field generation device 14 shown in FIG. 3.

The card insertion part 4 is provided with a fixed part 4a which is fixed to the main body part 6 and a protruded part 4b which protrudes toward a front side from the fixed part 4a. The protruded part 4b is not formed over the entire area in the right and left direction of the card insertion part 4. Specifically, the protruded part 4b is formed in a predetermined area from a left end of the card insertion part 4 toward its right end side and the right side of the protruded part 4b is formed as a cut-off part 4c where a portion protruding from the fixed part 4a toward the front side is not existed. In other words, the protruded part 4b and the cut-off part 4c are adjacent to each other in the right and left direction.

The protruded part 4b is formed in a hollow shape. Further, the protruded part 4b is provided with an upper side protruded part 4d and a lower side protruded part 4e which are disposed so as to interpose the insertion port 3 therebetween in the upper and lower direction. A magnetic field generation device 14 structured to generate a magnetic field is disposed in an inside of the lower side protruded part 4e which is disposed on a lower side with respect to the insertion port 3. The cut-off part 4c is, as shown in FIG. 3, formed at a position where the magnetic head 7 is disposed in the right and left direction. In other words, the cut-off part 4c is formed at a portion where a magnetic stripe 2a of a card 2 is passed. In this embodiment, the protruded part 4b is disposed with a card detector (not shown) for detecting that a card 2 is inserted into the insertion port 3.

The magnetic field generation device 14 is provided with a core 15 formed of magnetic material and a coil 16 for excitation which is wound with a center axis "CL" of the core 15 as a center. The core 15 is formed in a substantially rectangular solid bar shape. The coil 16 is wound around at a center position of the core 15. Each of both end parts of the coil 16 is connected with a terminal not shown. One of the terminals is connected with a power supply not shown through a predetermined cable and the other of the terminals is grounded through a predetermined cable. In this embodiment, the cable connected with the terminal with which the end part of the coil 16 is connected is disposed and routed in an inside of the fixed part 4a on a back side of a back end face 4f of the cut-off part 4c. The back end face 4f in this embodiment is a downstream side end face of the cut-off part 4c in an inserting direction of a card 2.

As shown in FIG. 3, the core 15 is disposed with the right and left direction as an axial direction of its center axis "CL". In other words, the core 15 is disposed in an inside of the protruded part 4b so that its center axis "CL" is parallel to the right and left direction. A part of the core 15 is disposed on a back side with respect to the back end face 4f of the cut-off part 4c in the front and rear direction. Further, the center axis "CL" of the core 15 is disposed on a back side with respect to the back end face 4f of the cut-off part 4c in the front and rear direction. Specifically, the center axis "CL" of the core 15 is disposed on a slightly back side with respect to the back end face 4f of the cut-off part 4c in the front and rear direction.

The magnetic field generation device 14 in this embodiment functions as a disturbing magnetic field generation device structured to generate a disturbing magnetic field for disturbing reading of magnetic data of a card 2 by a skimming magnetic head 20 which is attached to the front face side of the card insertion part 4. Therefore, the magnetic field generation device 14 is disposed so that magnetic lines of force "ML" (see FIG. 4) representing a magnetic field generated from the magnetic field generation device 14 are passed through at an attaching position of the skimming magnetic head 20. In other words, the magnetic field generation device 14 is disposed so that the magnetic lines of force "ML" pass through the position where the magnetic stripe 2a of a card 2 is passed at the time of insertion of the card 2. It is considered that a skimming magnetic head 20 is attached to the cut-off part 4c where a skimming magnetic head 20 is easily attached and thus, in this embodiment, the magnetic field generation device 14 is disposed so that the magnetic lines of force "ML" pass the cut-off part 4c. In FIG. 4, one magnetic line of force "ML" is shown for convenience but actually, the magnetic field generated by the magnetic field generation device 14 is formed of a large number of magnetic lines of force "ML".

In the magnetic field generation device 14, the coil 16 is excited to generate a magnetic field for disturbance. As shown in FIG. 4, in the magnetic lines of force "ML" representing the magnetic field generated by the magnetic field generation device 14, its direction entering into the center of one end face (end face in the center axis "CL" direction) of the core 15 and its direction coming out from the center of the other end face of the core 15 are substantially coincided with the axial direction of the center axis "CL" of the core 15. In other words, in this embodiment, the direction of the magnetic lines of force "ML" entering into the center of one end face of the core 15 and the direction of the magnetic lines of force "ML" coming out from the center of the other end face of the core 15 are substantially parallel to the right and left direction.

(Schematic Operation of Card Reader)

In the card reader 1 structured as described above, the card feeding passage 5 is closed by a shutter member not shown in a standby state when a card 2 is not inserted and a card 2 is unable to be inserted into the card reader. In this state, when a card detector disposed at the card insertion part 4 detects that a card 2 is inserted into the insertion port 3, the card feeding passage 5 is opened and the card 2 is taken into the inside of the card reader 1. Further, when the card detector detects that a card 2 is inserted, the magnetic field generation device 14 generates a magnetic field for disturbance. For example, the magnetic field generation device 14 generates a magnetic field for disturbance until a card 2 inserted from the insertion port 3 and taken into the inside of the card leader 1 is ejected. Alternatively, the magnetic field generation device 14 generates a magnetic field for disturbance during that feeding of a card 2 is performed from a time that the card 2 is inserted from the insertion port 3 and taken into the inside of the card leader 1 and until the card is ejected.

A front end of the card 2 ejected by the drive roller 8 and the pad roller 9 is located on a front side with respect to the back end face 4f of the cut-off part 4c but is located on a back side with respect to the front end face of the protruded part 4b. In other words, the front end side of the card 2 ejected by the drive roller 8 and the pad roller 9 is exposed in the cut-off part 4c. When the card 2 is ejected from the card reader 1, a user holds the front end side of the card 2 exposed in the cut-off part 4c and takes out the card 2 from the card reader 1. The protruded part 4b is provided for forming the cut-off part 4c where a card 2 is capable of being held when the card 2 is to be taken out from the card reader 1.

(Principal Effects in this Embodiment)

As described above, in this embodiment, the magnetic field generation device 14 is disposed so that its magnetic lines of force "ML" pass a position where a magnetic stripe 2a of a card 2 is passed at the time of insertion of the card 2 (in other words, the position where it is considered that a skimming magnetic head 20 is attached). Therefore, even when a skimming magnetic head 20 is attached to the front face side of the card insertion part 4, reading of magnetic data by a skimming magnetic head 20 is prevented by magnetic field for disturbance generated by the magnetic field generation device 14.

Further, in this embodiment, the core 15 is disposed so that its center axis "CL" is parallel to the right and left direction, and the direction of the magnetic lines of force "ML" entering into the center of one end face of the core 15 and the direction of the magnetic lines of force "ML" coming out from the center of the other end face of the core 15 are parallel to the right and left direction. Therefore, the magnetic field for disturbance generated by the magnetic field generation device 14 is hard to affect the magnetic head 7 which is disposed on the back side with respect to the magnetic field generation device 14. Accordingly, in this embodiment, without reducing the magnetic field generated by the magnetic field generation device 14 or, without stopping generation of the magnetic field at the time of reading of magnetic data by the magnetic head 7, influence of the magnetic field generated by the magnetic field generation device 14 on reading of magnetic data by the magnetic head 7 is reduced.

Especially, in this embodiment, the center axis "CL" of the core 15 is parallel to the right and left direction. Therefore, even when a distance between the magnetic head 7 and the magnetic field generation device 14 is short in the front and rear direction, influence of the magnetic field for disturbance generated by the magnetic field generation device 14 is hard to affect the magnetic head 7. Accordingly, in this embodiment, while influence of the magnetic field generated by the magnetic field generation device 14 which affects reading of magnetic data by the magnetic head 7 is reduced, a distance between the magnetic head 7 and the magnetic field generation device 14 can be shortened in the front and rear direction and, as a result, the size of the card reader 1 can be reduced.

In this embodiment, the cut-off part 4c is formed at a portion where the magnetic stripe 2a passes at the time of insertion of a card 2. Therefore, a criminal may easily attach a skimming magnetic head 20 to the cut-off part 4c. Accordingly, in this embodiment, an attaching position of a skimming magnetic head 20 is easily determined and, as a result, a magnetic field for preventing reading of magnetic data by a skimming magnetic head 20 is easily generated toward the skimming magnetic head 20. Further, in this embodiment, the front end side of a card 2 ejected by the drive roller 8 and the pad roller 9 is exposed in the cut-off part 4c and a user holds the front end side of the card 2 exposed in the cut-off part 4c and takes out the card 2 from the card reader 1. Therefore, the user easily notices that a skimming magnetic head 20 is attached to the cut-off part 4c.

In this embodiment, the magnetic field generation device 14 is disposed in the inside of the protruded part 4b which is required to form the cut-off part 4c for holding the front end side of a card 2 exposed in the cut-off part 4c and for taking out the card 2 from the card reader 1. Therefore, the magnetic field generation device 14 can be disposed by utilizing an inside of the hollow-shaped protruded part 4b which is usually formed as a dead space. Accordingly, in this embodiment, a space for disposing the magnetic field generation device 14 is not required to be provided separately in the card insertion part 4 and thus, the size of the card insertion part 4 is reduced.

In this embodiment, as shown in FIGS. 5(C) and 5(D), in a case that the position of the center axis "CL" of the core 15 and the position of the center "CL1" of a skimming magnetic head 20 are coincided with each other in the front and rear direction, even though a magnetic field for disturbance is generated by the magnetic field generation device 14, the magnetic field does not act on the skimming magnetic head 20 as a magnetic field for disturbance. In other words, in a case that the skimming magnetic head 20 is provided with a core 21 and a coil 22 wound around the core 21, and the core 21 is provided with a first core part 21a and a second core part 21b facing each other in the front and rear direction through a magnetic gap 20a, when the position of the center axis "CL" of the core 15 and the center "CL1" of the skimming magnetic head 20 are coincided with each other in the front and rear direction, a direction of magnetic lines of force "ML1" indicating a magnetic field generated in the first core part 21a due to influence of the magnetic field generated by the magnetic field generation device 14 is opposite to a direction of magnetic lines of force "ML2" indicating a magnetic field generated in the second core part 21b due to influence of the magnetic field generated by the magnetic field generation device 14 and, in addition, the density of the magnetic lines of force "ML1" and the density of the magnetic lines of force "ML2" are equal to each other. Therefore, a magnetic field generated in the first core part 21a and a magnetic field generated in the second core part 21b are balanced with each other due to influence of the magnetic field generated by the magnetic field generation device 14 and thus an electric current due to influence of the magnetic field generated by the magnetic field generation device 14 does not flow the coil 22 and noise for disturbance is not applied to magnetic data which are read by the skimming magnetic head 20.

In this embodiment, the center axis "CL" of the core 15 is disposed on the back side with respect to the back end face 4f of the cut-off part 4c in the front and rear direction. Therefore, the position of the center "CL1" of the skimming magnetic head 20 which is attached to the front face side of the card insertion part 4 is not coincided with the position of the center axis "CL" of the core 15 in the front and rear direction. Accordingly, as shown in FIGS. 5(A) and 5(B), the density of the magnetic lines of force "ML1" indicating the magnetic field generated in the first core part 21a due to influence of the magnetic field generated by the magnetic field generation device 14 is different from the density of the magnetic lines of force "ML2" indicating the magnetic field generated in the second core part 21b due to influence of the magnetic field generated by the magnetic field generation device 14. Therefore, due to the influence of the magnetic field generated by the magnetic field generation device 14, the magnetic field generated in the first core part 21a and the magnetic field generated in the second core part 21b are not balanced with each other and thus, an electric current due to influence of the magnetic field generated by the magnetic field generation device 14 flows the coil 22 and noise for disturbance is applied to magnetic data which are read by the skimming magnetic head 20. As a result, according to this embodiment, reading of magnetic data by the skimming magnetic head 20 is surely prevented by magnetic field for disturbance generated by the magnetic field generation device 14.

In this embodiment, a cable connected with terminals with which end parts of the coil 16 of the magnetic field generation device 14 are connected are disposed and routed in an inside of the fixed part 4a and the like on the back side of the back end face 4f of the cut-off part 4c. Therefore, for example, when a criminal cuts and removes the back end face 4f toward the back side for setting the position of the center axis "CL" of the core 15 and the position of the center "CL1" of the skimming magnetic head 20 to coincide with each other in the front and rear direction, the cable may be disconnected. Accordingly, for example, when it is structured so that disconnection of the cable is detected, it may be detected that a criminal has performed a trick for setting the position of the center axis "CL" of the core 15 and the position of the center "CL1" of the skimming magnetic head 20 to coincide with each other in the front and rear direction.

(Modified Example of Magnetic Field Generation Device)

Figure 6:
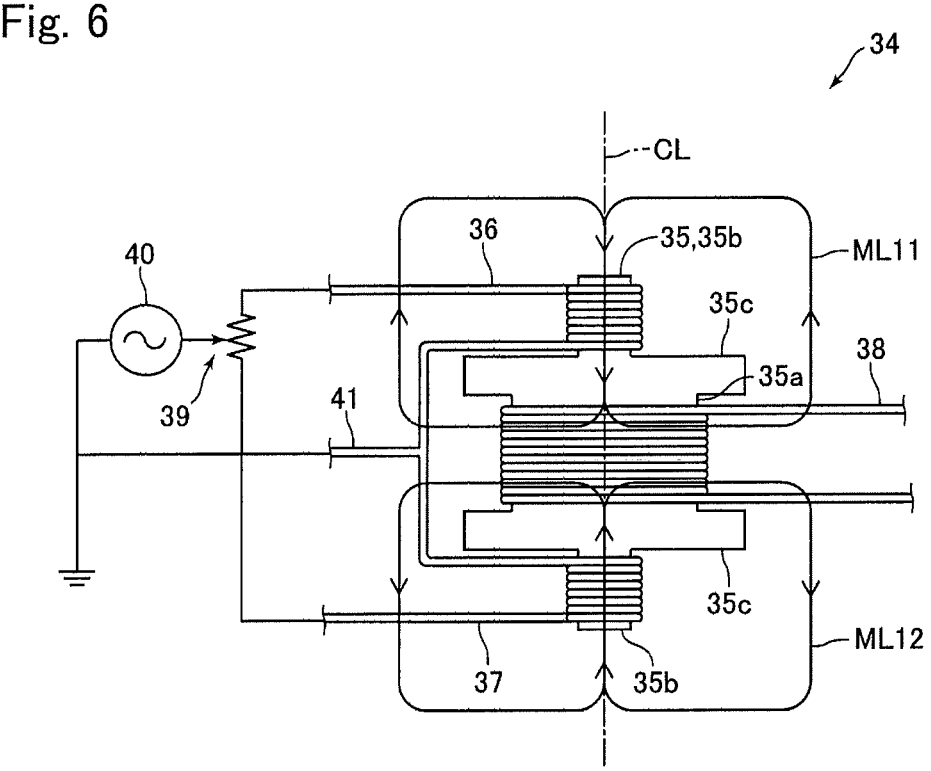
FIG. 6 is an explanatory view showing a structure of a magnetic field generation device in accordance with another embodiment of the present invention.

FIG. 6 is an explanatory view showing a structure of a magnetic field generation device 34 in accordance with another embodiment of the present invention.

Instead of using the magnetic field generation device 14 in the embodiment described above, a magnetic field generation device 34 shown in FIG. 6 may be disposed in an inside of the lower side protruded part 4e. The magnetic field generation device 34 is provided with a core 35 formed of magnetic material, a pair of coils 36 and 37 for excitation and a coil 38 for detection which are wound around with the center axis "CL" of the core 35 as a center, terminals (not shown) with which end parts of the coils 36 and 37 are connected, and terminals (not shown) with which end parts of the coil 38 are connected.

The core 35 is formed in a thin plate shape whose thickness direction is a direction perpendicular to the paper surface in FIG. 6. The core 35 is structured of a center core part 35a which is disposed at a substantially center in an axial direction of the center axis "CL", a pair of axial end core parts 35b which are disposed on respective both end sides of the center core part 35a in the axial direction of the center axis "CL", and flange parts 35c which are disposed between the center core part 35a and the axial end core parts 35b. A width of the center core part 35a is wider than a width of the axial end core part 35b. Further, a width of the flange part 35c is wider than the width of the center core part 35a.

The coil 38 is wound around the center core part 35a. Each of both end parts of the coil 38 is connected to the terminal. One end part of a predetermined cable is connected with the terminal and the other end part of the cable is connected with a control circuit board of the card reader 1.

The coils 36 and 37 are respectively wound around a pair of the axial end core parts 35b. One end parts of the coils 36 and 37 are connected with terminals. The terminal is connected with one end part of a predetermined cable and the other end part of the cable is connected with an AC power source 40 through a variable resistor 39 which is mounted on the control circuit board of the card reader 1. The other end parts of the coils 36 and 37 are connected with one end part of a conducting wire 41. The other end part of the conducting wire 41 is connected with a terminal. The terminal is connected with one end part of a predetermined cable and the other end part of the cable is grounded. In this case, the cable connected with the terminals with which the end parts of the coils 36 and 37 for excitation are connected is disposed and routed in the inside of the fixed part 4a and the like on the back side with respect to the back end face 4f of the cut-off part 4c.

Similarly to the embodiment described above, the core 35 is disposed with the right and left direction as an axial direction of the center axis "CL". Further, a part of the core 35 is disposed on the back side with respect to the back end face 4f of the cut-off part 4c in the front and rear direction. In addition, the center axis "CL" of the core 35 is disposed on the back side with respect to the back end face 4f of the cut-off part 4c in the front and rear direction.

The magnetic field generation device 34 is provided with a function as a disturbing magnetic field generation device, which generates a disturbing magnetic field for disturbing reading of magnetic data of a card 2 by a skimming magnetic head 20 attached to the front face side of the card insertion part 4, and a function as a magnetic sensor which is structured so that variation of a magnetic field generated by the coils 36 and 37 is detected by the coil 38 to detect attachment of the skimming magnetic head 20 to the front face side of the card insertion part 4. Therefore, the magnetic field generation device 34 is disposed so that magnetic lines of force "ML11" indicating a magnetic field generated by the coil 36 or magnetic lines of force "ML12" indicating a magnetic field generated by the coil 37 pass an attaching position of the skimming magnetic head 20.

In a case that the magnetic field generation device 34 functions as a disturbing magnetic field generation device, the coils 36 and 37 are excited and a magnetic field for disturbance is generated. For example, a magnetic field for disturbance is generated so that magnetic lines of forces "ML11" and "ML12" are entered into the end faces of the axial end core parts 35b. As shown in FIG. 6, the directions of the magnetic lines of forces "ML11" and "ML12" which enter into the centers of the end faces of the axial end core parts 35b are substantially coincided with the axial direction of the center axis "CL" of the core 35. In accordance with an embodiment of the present invention, in the magnetic field generation device 34, a magnetic field for disturbance may be generated so that magnetic lines of forces "ML11" and "ML12" come out from the end faces of the axial end core parts 35b.

Further, in a case that the magnetic field generation device 34 functions as a magnetic sensor, the coils 36 and 37 are excited so that, when no skimming magnetic head 20 is provided in a detectable area of the magnetic field generation device 34 (area where magnetic lines of force "ML11" or "ML12" passes), a density of the magnetic lines of force "ML11" indicating a magnetic field generated by the coil 36 and a density of the magnetic lines of force "ML12" indicating a magnetic field generated by the coil 37 are substantially equal to each other and, in addition, a direction of the magnetic lines of force "ML11" and a direction of the magnetic lines of force "ML12" are opposite to each other. In other words, when a skimming magnetic head 20 is not provided in a detectable area of the magnetic field generation device 34, the variable resistor 39 is adjusted so that the magnetic field generated by the coil 36 and the magnetic field generated by the coil 37 are balanced with each other and thus, when a skimming magnetic head 20 is not provided in a detectable area of the magnetic field generation device 34, a voltage is not generated between both end parts of the coil 38.

Therefore, when a skimming magnetic head 20 is attached in a detectable area of the magnetic field generation device 34, a magnetic field generated by the coil 36 and a magnetic field generated by the coil 37 are not balanced with each other due to the influence of the skimming magnetic head 20 and thus a voltage is generated between both end parts of the coil 38. As described above, the magnetic field generation device 34 detects the skimming magnetic head 20 by detecting a voltage generated between both end parts of the coil 38. In a case that the magnetic field generation device 34 functions as a magnetic sensor, an exciting current supplied to the coils 36 and 37 is set to be smaller than an exciting current supplied to the coils 36 and 37 when the magnetic field generation device 34 functions as a disturbing magnetic field generation device.

As described above, when the magnetic field generation device 34 is disposed instead of using the magnetic field generation device 14, for example, the magnetic field generation device 34 functions as a magnetic sensor in a standby state when a card 2 is not inserted. Further, in a standby state, the card feeding passage 5 is closed by a shutter member and the like and thus a card 2 is unable to be inserted into the card reader 1. In this state, when a metal member such as a skimming magnetic head 20 is detected by the magnetic field generation device 34, the state that the card feeding passage 5 is closed is maintained and the state that a card 2 is unable to be inserted into the card reader 1 is maintained for preventing skimming.

Further, in a standby state that a card 2 is not inserted and, in a state that the magnetic field generation device 34 does not detect a metal member such as a skimming magnetic head 20, when a card detector disposed in the card insertion part 4 detect that a card 2 is inserted into the insertion port 3, the magnetic field generation device 34 functions as a disturbing magnetic field generation device. In other words, when it is detected that a card 2 is inserted into the insertion port 3, the magnetic field generation device 34 generates a magnetic field for disturbance. For example, the magnetic field generation device 34 generates a magnetic field for disturbance from the time when a card 2 is inserted into the insertion port 3 until the card 2 taken into the inside of the card reader 1 is ejected.

As described above, when the magnetic field generation device 34 is disposed in the inside of the lower side protruded part 4e instead of the magnetic field generation device 14, in a case that the magnetic field generation device 34 functions as a disturbing magnetic field generation device, reading of magnetic data by a skimming magnetic head 20 is prevented by a magnetic field for disturbance generated by the magnetic field generation device 34, and alternatively, in a case that the magnetic field generation device 34 functions as a magnetic sensor, the magnetic field generation device 34 detects that a skimming magnetic head 20 is attached to the front face side of the card insertion part 4. Further, without reducing the magnetic field generated by the magnetic field generation device 34, or without stopping generation of the magnetic field at the time of reading of magnetic data by the magnetic head 7, the effects similar to the embodiment described above can be obtained, for example, influence of the magnetic field generated by the magnetic field generation device 34 on reading of magnetic data by the magnetic head 7 is reduced.

In accordance with an embodiment of the present invention, the magnetic field generation device 34 may have a function only as a magnetic sensor. Further, the magnetic field generation device 34 may generate a magnetic field for disturbance only when the magnetic field generation device 34 detects a metal member such a skimming magnetic head 20. Further, the magnetic field generation device 34 may be structured of a core and a coil which is wound around the core and is used for both of excitation and detection.

Other Embodiments

Although the present invention has been shown and described with reference to a specific embodiment, various changes and modifications will be apparent to those skilled in the art from the teachings herein.

In the embodiment described above, the center axis "CL" of the core 15 is parallel to the right and left direction. However, the present invention is not limited to this embodiment. For example, in a case that the center axis "CL" of the core 15 is parallel to the right and left direction when viewed in the upper and lower direction, the center axis "CL" of the core 15 may be inclined with respect to the right and left direction when viewed in the front and rear direction. In this case, the magnetic field generation device 14 may be disposed in the inside of the lower side protruded part 4e or may be disposed in the inside of the upper side protruded part 4d.

Further, in the embodiment described above, the center axis "CL" of the core 15 is parallel to the right and left direction. However, under a condition that the center axis "CL" of the core 15 is not parallel to the front and rear direction (in other words, under a condition that the center axis "CL" is inclined with respect to the front and rear direction), the center axis "CL" of the core 15 may be inclined with respect to the right and left direction when viewed in the upper and lower direction. Also in this case, a magnetic field generated by the magnetic field generation device 14 is hard to affect the magnetic head 7. Therefore, without reducing the magnetic field generated by the magnetic field generation device 14, or without stopping generation of the magnetic field at the time of reading of magnetic data by the magnetic head 7, influence of the magnetic field generated by the magnetic field generation device 14 on reading of magnetic data by the magnetic head 7 is reduced.

In the embodiment described above, the center axis "CL" of the core 15 is disposed on the back side with respect to the back end face 4f of the cut-off part 4c in the front and rear direction. However, the present invention is not limited to this embodiment. For example, the center axis "CL" of the core 15 may be disposed at the same position as the back end face 4f of the cut-off part 4c in the front and rear direction. Further, the center axis "CL" of the core 15 may be disposed on the front side with respect to the back end face 4f of the cut-off part 4c when the center axis "CL" of the core 15 is disposed on the back side with respect to the center "CL1" of a skimming magnetic head 20, or when the center axis "CL" of the core 15 is disposed on a front side with respect to the center "CL1" of a skimming magnetic head 20 (in other words, the position of the center axis "CL" of the core 15 and the position of the center "CL1" of a skimming magnetic head 20 are displaced from each other in the front and rear direction). Further, in the embodiment described above, a part of the core 15 is disposed on the back side with respect to the back end face 4f of the cut-off part 4c in the front and rear direction. However, the entire core 15 may be disposed on a front side with respect to the back end face 4f of the cut-off part 4c in the front and rear direction when the center axis "CL" of the core 15 is disposed on the back side with respect to the center "CL1" of a skimming magnetic head 20, or when the center axis "CL" of the core 15 is disposed on the front side with respect to the center "CL1" of a skimming magnetic head 20.

In the embodiment described above, the protruded part 4b is formed over a predetermined area from a left end of the card insertion part 4 toward its right end side and the right side with respect to the protruded part 4b is formed as the cut-off part 4c where no protruding portion is formed from the fixed part 4a to the front side. However, the present invention is not limited to this embodiment. For example, the protruded part 4b may be structured of a first protruded part, which is formed over a predetermined area from the left end of the card insertion part 4 toward its right end side, and a second protruded part formed over a predetermined area from the right end of the card insertion part 4 toward its left end side, and a portion between the first protruded part and the second protruded part is formed as the cut-off part 4c where no protruding portion is formed from the fixed part 4a to the front side. As described above, it is sufficient that the cut-off part 4c is formed in the right and left direction at least at a portion where the magnetic head 7 is disposed.

In the embodiment described above, the card reader 1 is a card feeding type card reader provided with the drive roller 8 and the pad roller 9. However, a card reader to which the structure of at least an embodiment of the present invention is applied may be a manual type card reader in which reading and/or recording of magnetic data are performed while manually moving a card 2 by a user. For example, a card reader to which the structure of at least an embodiment of the present invention is applied may be a so-called dip type card reader in which reading and/or recording of magnetic data are performed when a card 2 is inserted into the card reader or when a card 2 is taken out from the card reader.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card insertion part for a card reader into which a card having a magnetic stripe is to be inserted, the card insertion part comprising:
   a cut-off part which is formed at least at a portion where the magnetic stripe passes when the card is inserted;
   a protruded part which is adjacent to the cut-off part in a widthwise direction of the card which is substantially perpendicular to an inserting direction of the card and is protruded toward an upstream side in the inserting direction of the card; and a magnetic field generation device which is disposed in an inside of the protruded part and is structured to generate a magnetic field;

wherein the magnetic field generation device comprises a core formed of magnetic material and a coil wound around the core; and wherein the magnetic field generation device is disposed so that magnetic lines of force indicating the magnetic field generated by the magnetic field generation device are passed through a position where the magnetic stripe is passed when the card is inserted and so that a direction of the magnetic lines of force coming out from an end face of the core and/or a direction of the magnetic lines of force entering into an end face of the core are inclined with respect to the inserting direction of the card.

2. The card insertion part according to claim 1, wherein the magnetic field generation device is disposed so that, when viewed in a thickness direction of the card which is substantially perpendicular to the inserting direction of the card and the widthwise direction of the card, the direction of the magnetic lines of force coming out from an end face of the core and/or the direction of the magnetic lines of force entering into an end face of the core are substantially parallel to the widthwise direction of the card.

3. The card insertion part according to claim 1, wherein
the core is disposed with the widthwise direction of the card as a direction of a center axis of the core when viewed in a thickness direction of the card which is substantially perpendicular to the inserting direction of the card and the widthwise direction of the card, and
the coil is wound with the center axis of the core as a center.

4. The card insertion part according to claim 3, wherein the magnetic field generation device is structured to generate a disturbing magnetic field for disturbing reading of magnetic data recorded in the magnetic stripe by a skimming magnetic head which is attached to a front face side of the card insertion part.

5. The card insertion part according to claim 4, wherein a part of the magnetic field generation device is disposed on a downstream side in the inserting direction of the card with respect to a downstream side end face of the cut-off part in the inserting direction of the card.

6. The card insertion part according to claim 5, wherein
the magnetic field generation device comprises a cable structured to supply an electric current to the coil, and
the cable is disposed and routed in a vicinity of the downstream side end face of the cut-off part.

7. The card insertion part according to claim 4, wherein the center axis of the core is disposed in the inserting direction of the card at a same position as a downstream side end face of the cut-off part in the inserting direction of the card, or the center axis of the core is disposed on a downstream side with respect to the downstream side end face of the cut-off part.

8. A card reader comprising:
the card insertion part set forth in claim 1; and
a magnetic head structured to read magnetic data recorded in the magnetic stripe.

* * * * *